(12) United States Patent
Morioka (10) Patent No.: US 7,447,793 B2
(45) Date of Patent: Nov. 4, 2008

(54) CONTENT MANAGEMENT APPARATUS, CONTENT MANAGEMENT SYSTEM, AND CONTENT MANAGEMENT PROGRAM

(75) Inventor: Yasuhiro Morioka, Kanagawa-Ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 778 days.

(21) Appl. No.: 10/926,265

(22) Filed: Aug. 26, 2004

(65) Prior Publication Data

US 2005/0050181 A1 Mar. 3, 2005

(30) Foreign Application Priority Data

Aug. 28, 2003 (JP) ............................. 2003-304655

(51) Int. Cl.
*G06F 15/16* (2006.01)
(52) U.S. Cl. .................. 709/231; 709/225; 709/228
(58) Field of Classification Search ............... 709/225, 709/228, 231
See application file for complete search history.

(56) References Cited

U.S. PATENT DOCUMENTS

| | | | |
|---|---|---|---|
| 6,810,528 B1 * | 10/2004 | Chatani ..................... | 725/109 |
| 6,910,068 B2 * | 6/2005 | Zintel et al. ................. | 709/220 |
| 6,957,396 B2 * | 10/2005 | Iwamura ..................... | 715/771 |
| 7,130,925 B2 * | 10/2006 | Noda et al. ................. | 709/249 |
| 7,171,475 B2 * | 1/2007 | Weisman et al. ............ | 709/227 |
| 7,194,689 B2 * | 3/2007 | Manni et al. ................ | 715/735 |
| 7,269,662 B2 * | 9/2007 | Takeuchi et al. ............ | 709/232 |
| 2002/0027569 A1 * | 3/2002 | Manni et al. ................ | 345/764 |
| 2002/0029256 A1 * | 3/2002 | Zintel et al. ................. | 709/218 |
| 2002/0035621 A1 * | 3/2002 | Zintel et al. ................. | 709/220 |
| 2002/0078161 A1 * | 6/2002 | Cheng ......................... | 709/208 |
| 2002/0083143 A1 * | 6/2002 | Cheng ......................... | 709/208 |
| 2002/0112058 A1 * | 8/2002 | Weisman et al. ............ | 709/227 |

(Continued)

FOREIGN PATENT DOCUMENTS

JP 2002-304333 10/2002

OTHER PUBLICATIONS http://www.ietf.org/rfc/rfc2396.txt (Aug. 1998) pp. 1-36.

(Continued)

*Primary Examiner*—William C. Vaughn, Jr.
*Assistant Examiner*—Saeed S Mirzadegan
(74) *Attorney, Agent, or Firm*—Finnegan, Henderson, Farabow, Garrett & Dunner, L.L.P.

(57) ABSTRACT

A content management apparatus includes a content information provider, a table generator, a table update unit, and a location information replacement unit. The content information provider provides content information including permanent identification information indicating a storage location of contents. The table generator generates an equipment information management table which associates permanent identification information for identifying a first communication apparatus and temporary communication address information for communicating with the first communication apparatus. The table update unit is configured to update information of the equipment information management table. The location information replacement unit is configured to replace the permanent identification information in the content information by the temporary communication address, based on the equipment information management table.

12 Claims, 8 Drawing Sheets

U.S. PATENT DOCUMENTS

| | | |
|---|---|---|
| 2003/0007505 A1* | 1/2003 | Noda et al. .................. 370/467 |
| 2004/0030793 A1* | 2/2004 | Noda et al. .................. 709/230 |
| 2005/0074018 A1* | 4/2005 | Zintel et al. ................. 370/401 |
| 2005/0097503 A1* | 5/2005 | Zintel et al. ................. 717/100 |
| 2005/0177560 A1* | 8/2005 | Morioka ........................ 707/3 |
| 2006/0010383 A1* | 1/2006 | Tanaka et al. ............... 715/716 |
| 2006/0089987 A1* | 4/2006 | Igarashi et al. .............. 709/225 |
| 2006/0168159 A1* | 7/2006 | Weisman et al. ............ 709/220 |
| 2006/0179138 A1* | 8/2006 | Van Gassel et al. ......... 709/225 |
| 2006/0184661 A1* | 8/2006 | Weisman et al. ............ 709/224 |
| 2006/0184851 A1* | 8/2006 | Froidcoeur et al. .......... 714/746 |
| 2006/0212531 A1* | 9/2006 | Kikkawa et al. ............. 709/217 |
| 2007/0255796 A1* | 11/2007 | Lee et al. .................... 709/208 |

OTHER PUBLICATIONS

Nishiuma et al.; "The Design and Implementation of WWW Publishing Cluster With Notification-Based Synchronization"; IPSJ Journal, IPSJ, vol. 43, No. 11, pp. 3439-3447, (2002).

* cited by examiner

F I G. 1

F I G. 2

F I G. 3 request: Browse ("3", "BrowseDirectChildren", "*",0,3,"+dc:title")
response: Browse(
"<DIDL-Lite" xmlns:dc=http://purl.org/dc/elements/1.1/
    xmlns:upnp="urn:schemas-upnp-org:metadata-1-0/upnp/"
    xmlns="usn:schemas-upnp-org:metadata-1-0/DIDL-Lite/">
    <item id="6" parented="3" restricted="false">
        <dc:title>Chloe Dancer</dc:title>
        <dc:creator>Mother Love Bone</dc:creator>
        <upnp:class>object.item.audioItem.musicTrack</upnp:class>
        <res protocolInfo="http-get-:*:audio/x-ms-wma:"size="200000">
            http://192.168.10.123/getcontent.asp?id=6
        </res>
    </item>
    <item id="8" parented="3" restricted="false">
        <dc:title>Drown</dc:title>
        <dc:creator>Smashing Pumpkins</dc:creator>
        <upnp:class>object.item.audioItem.musicTrack</upnp:class>
        <res protocolInfo="http-get-:*:audio/mpeg:*"size="140000">
            http://192.168.10.123/getcontent.asp?id=8
        </res>
    </item>
    <item id="7" parented="3" restricted="false">
        <dc:title>State Of Love And Trust</dc:title>
        <dc:creator>Pearl Jam</dc:creator>
        <upnp:class>object.item.audioItem.musicTrack</upnp:class>
        <res protocolInfor="http-get-:*:audio/x-ms-wma:* " size="70000">
            http://192.168.10.101/getcontent.asp?id=7
        </res>
    </item>
</DIDL-Lite>",3,4,18)  } r1 request: Browse("3","BrowseDirectChildren","*",3,3,"+dc:title")
response: Browse(
"<DIDL-Lite" xmlns:dc=http://purl.org/dc/elements/1.1/
    xmlns:upnp="urn:schemas-upnp-org:metadata-1-0/upnp/"
    xmlns="usn:schemas-upnp-org:metadata-1-0/DIDL-Lite/">
    <item id="5" parented="3" restricted="false">
        <dc:title>Would</dc:title>
        <dc:creator>Alice In Chains</dc:creator>
        <upnp:class>object.item.audioItem.musicTrack</upnp:class>
        <res protocolInfo="http-get-:*:audio/x-ms-wma:"size="90000">
            http:// 192.168.12.56/getcontent.asp?id=5
        </res>
    </item>
</DIDL-Lite>",1,4,18)  } r2

F I G. 4

F I G. 5

| DEVICE IDENTIFIER | ADDRESS OF COMMUNICATION DEVICE | LATEST UPDATE DATE AND TIME |
|---|---|---|
| MACID_00_03_47_20_79_89 | 192.168.10.101 | 2003/03/24 08:27:30 |
| MACID_01_32_56_3E_29_76 | 192.168.10.145 | 2003/03/23 15:23:45 |
| UDN_uuid_D1245B73A-008D-87FE-563E-23A2D5BF2D23 | 192.168.10.123 | 2003/03/23 17:54:23 |
| UDN_uuid_9FB4FE9A-8D03-4C57-9A0E-AFA2D67237DE | 192.168.12.56 | 2003/03/20 13:43:21 |
| UDN_uuid_DF1F4E3B-D96E-4008-8499-BC0E153EBEEF | 192.168.56.87 | 2003/02/05 13:38:46 |
| UDN_uuid_6384AAED-643F-4ff7-9F85-73704A3F8C11 | 133.127.244.15 | 2003/02/05 13:13:32 |

CONTENT INFORMATION

```
<item id="5" parented="3" restricted="false">
    <dc:title>Would</dc:title>
    <dc:creator>Alice In Chains</dc:creator>
    <upnp:class>object.item.audioItem.musiTrack</upnp:class>
    <res protocolInfo="http-get-:*audio/x-ms-wma:*" size="90000">
        http://UDNuuid9FB-4FE9A-8D03-4c57-9A0E-AFA2D67237DE/getcontent.asp?id=5
    </res>
</item>
```

| DEVICE IDENTIFIER | ADDRESS OF COMMUNICATION DEVICE | LATEST UPDATE DATE AND TIME |
|---|---|---|
| UDN_uuid_9FB4FE9A-8D03-4c57-9A0E-AFA2D67237DE | 192.168.12.56 | 2003/03/20 13:43:21 |

TEMPORARY CONTENT POSITION INFORMATION⇒CONTENT POSITION INFORMATION

UDN_uuid_9FB4FE9A-8D03-4c57-9A0E-AFA2D67237DE
192.168.12.56

CONTENT INFORMATION AT FINAL RESPONSE

```
<item id="5" parented="3" restricted="false">
    <dc:title>Would</dc:title>
    <dc:creator>Alic In Chains</dc:creator>
    <upnp:class>object.item.audioItem.musicTrack</upnp:class>
    <res protocolInfo="http-get-:*:audio/x-ms-wma:*" size="90000">
        http://192.168.12.56/getcontent.asp?id=5
    </res>
</item>
```

TIME PASAGE

| DEVICE IDENTIFIER | ADDRESS OF COMMUNICATION DEVICE | LATEST UPDATE DATE AND TIME |
|---|---|---|
| UDN_uuid_9FB4FE9A-8D03-4c57-9A0E-AFA2D6723DE | 192.168.12.64 | 2003/03/21 12:56:28 |

UDN_uuid_9FB4FE9A-8D03-4c57-9A0E-AFA2D67237DE
192.168.12.56

CONTENT INFORMATION AT FINAL RESPONSE

```
<item id="5" parented="3" restricted="false">
    <dc:title>Would</dc:title>
    <dc:creator>Alice In Chains</dc:creator>
    <upnp:class>object.item.audioItem.musicTrack</upnp:class>
    <res protocolInfo="http-get-:*:audio/x-ms-wma:*" size="90000">
        http://192.168.12.64/getcontent.asp?id=5
    </res>
</item>
```

CONTENT MANAGEMENT APPARATUS, CONTENT MANAGEMENT SYSTEM, AND CONTENT MANAGEMENT PROGRAM

CROSS REFERENCE TO RELATED APPLICATIONS

This application claims benefit of priority under 35USC§119 to Japanese Patent Application No. 2003-304655, filed on Aug. 28, 2003, the entire contents of which are incorporated by reference herein.

BACKGROUND OF THE INVENTION

1. Field of the Invention

The present invention relates to a content management apparatus, a content management system, and a content management program, for managing contents provided via a network.

2. Related Background Art

Recently, there have been many cases to connect electronic equipments such as audio devices, video devices, personal computers, and information equipments via a network, in order to transfer information between them. In these cases, it is necessary to prescribe operation method of the equipments and procedure for associating with each other as standards, and to operate the equipments in according with the standards. One of such standards is UPnP AV (Universal Plug and Play/Audio and Visual), the UPnP is a specification for the AV (see US Patent Application Publication No. 2002-0035621 A1).

The UPnP AV adopts a model in which a media server and a media renderer, being two types of devices, are controlled by a control point, being a device of a separate type. The media server plays a role of storing contents and as a source for streaming. The media renderer plays a role of reproducing the contents and as a sink for streaming. The control point inquires of the media server about a location of a content, selects a media renderer agreeing with the source capability for streaming, and establishes a stream transmission line between these two devices (the media server and the media renderer) to control the transmission (see Japanese Patent Application Laid-open No. 2002-304333).

In the UPnP AV media server, a content directory service (CDS) performs a role of storing contents and responding to inquiries of content information from the control point. The CDS stores metadata of contents, so that the control point can perform functions of browsing the content hierarchy, searching the attribute, creating and deleting the content, and changing the attribute.

The metadata includes the title, the artist, and the format of the contents, and the location of the media resource (hereinafter, "res value"), and these are described in the Extensible Markup Language (XML). The control point sets the res value of the metadata obtained by the inquiry to the CDS, in the media source of the media server or the media sink of the media renderer, as a location of the media resource to be referred to, and sets a transmission path between the media source of the media server and the media sink of the media renderer. The res value is given by the Uniform Resource Identifier (URI) RFC2396 (see internet Engineering Task Force (IETF) web site).

The description format of the URI is given by <scheme>:// <scheme-specific-part>, or <scheme>:// <authority><path>?<query>. For example, it is provided such as http://192.168.10.111:8080/MyMusic.sample.mp3.

In this case, "http" denotes the scheme, "192.168.10.111: 8080" denotes the authority, and "/MyMusic/sample.mp3" denotes the path, indicating that it is a media resource referred to as "/MyMusic/sample.mp3" accessible through a port number. 8080 of the host 192.168.10.111, by using the HyperText Transfer Protocol (HTTP) protocol.

In many cases, the authority part is expressed by a set of a host name and a port number, and the host name is Domain Name Service (DNS), and a Fully Quantified Domain Name (FQDN) capable of performing name resolution to an IP address or the IP address itself is used therefor.

One of the functions of the media server is storage of the contents, and the media resource may be outside of the media server. In this case, the media resource exists in the equipment around the media server or in a media distribution site on the Wide Area Network (WAN) or the Internet, and the content corresponding to the equipment is set in the authority part of the res value.

There is a problem for a handling in the case where the IP address itself is set in the authority part. When any of the name resolution means such as assignment by FQDN is provided, there is no problem since the host name can be converted to an IP address by the name resolution means.

When the IP address itself is set, it is necessary to determine whether the IP address is static or dynamic. That is, the IP address in the authority part of the res value of the media resource stored in the equipment to which a dynamic address is allocated should change with a lapse of time, but there is no way to know that. In this case, the res value returned from the CDS becomes an unintended value different from the former value.

However, there is a problem in that the workload is very large for reconstruction at the time of startup operation of the CDS. This becomes noticeable in the in-house use or the like in which the respective equipment operate autonomously, including the allocation of the IP address.

Therefore, it is desired to provide the CDS which changes following a change in the IP address of the equipment, in terms of the media resource held by the equipment in which the IP address can change dynamically.

BRIEF SUMMARY OF THE INVENTION

With the view to the above problems, it is an object of the present invention to provide a content management apparatus, a content management system, and a content management program, which can provide accurate content information at all times, even when communication addresses change.

A content management apparatus according to one embodiment of the present invention, comprising:

a content information provider which provides content information including permanent identification information indicating a storage location of contents;

a table generator which generates an equipment information management table which associates permanent identification information for identifying a first communication apparatus and temporary communication address information for communicating with said first communication apparatus with each other;

a table update unit configured to update information of said equipment information management table; and a location information replacement unit configured to replace the permanent identification information in the content information by the temporary communication address, based on said equipment information management table.

A content management system according to one embodiment of the present invention, comprising:
  a first communication apparatus which provides contents to be held;
  a second communication apparatus which receives contents provided from said first communication apparatus;
  a content management apparatus which provides content information relating to contents provided by said first communication apparatus; and
  a control apparatus which performs control for providing contents from said first communication apparatus to said second communication apparatus,
  said content management apparatus includes:
  a content information provider which provides content information including permanent identification information indicating a storage location of contents;
  a table generator which generates an equipment information management table which associates permanent identification information for identifying a first communication apparatus and temporary communication address information for communicating with said first communication apparatus with each other;
  a table update unit configured to update information of said equipment information management table; and
  a location information replacement unit configured to replace the permanent identification information in the content information by the temporary communication address, based on said equipment information management table.

A content management program according to one embodiment of the present invention which makes a computer execute the steps of comprising:
  providing content information including permanent identification information indicating a storage location of contents;
  generating an equipment information management table which associates permanent identification information for identifying a first communication apparatus and temporary communication address information for communicating with said first communication apparatus with each other;
  updating information of said equipment information management table; and
  replacing the permanent identification information in the content information by the temporary communication address, based on said equipment information management table.

BRIEF DESCRIPTION OF THE DRAWINGS

FIG. 4 is a diagram showing an inquiry to the content directory service of the media server 3 by the controller 5 and a response example thereof.

DETAILED DESCRIPTION OF THE INVENTION

A content management apparatus, a content management system, and a content management program according to the present invention will be specifically explained below, with reference to the accompanying drawings.

Figure 1:
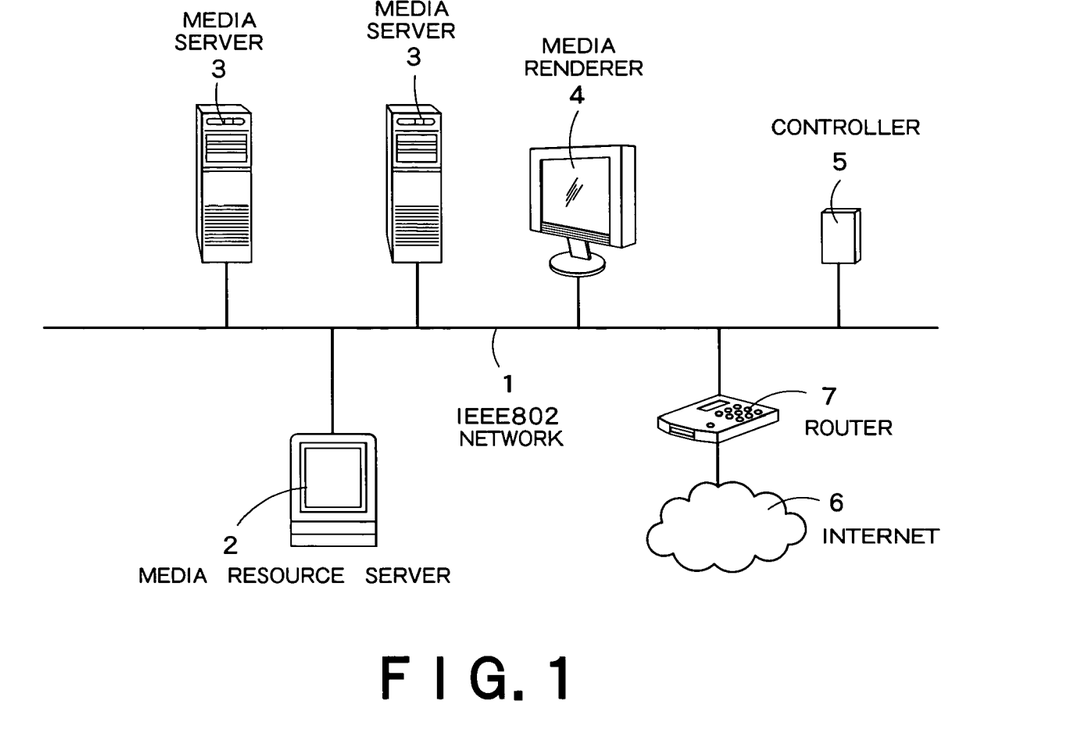
FIG. 1 is a block diagram showing a schematic configuration of one embodiment of the content management system according to the present invention.

FIG. 1 is a block diagram showing a schematic configuration of one embodiment of the content management system according to the present invention. The content management system in FIG. 1 includes a media resource server 2 connected to an IEEE network 1, a plurality of media servers 3, a media renderer 4, a controller 5, and a router 7 for the connection to the Internet 6.

The media resource server 2 provides contents held therein. The media server 3 is an AV equipment for recording and holding the content. The media server can provide the content information held by other AV equipment connected to the media resource server 2, another media server 3, and the Internet 6 to the controller 5 or the media renderer 4, other than recording and holding the content.

The media server 3, the media renderer 4, and the controller 5 constitute an AV system conforming to the UPnP standards, and the media resource server 2 and the router 7 are the equipment out of the UPnP standards.

The controller 5 performs a role of a control point provided by the UPnP A/V standards. That is, the controller 5 controls the media server 3 and the media renderer 4, and selects a specific content from a content directory managed by the media server 3, and selects a media renderer 4 suitable for reproducing the content. The controller 5 generates a transmission channel for the content between the media server 3 and the media renderer 4 to control transmission and reproduction of content data.

The transmission channel may be provided on the network the same as the network 1 used for inquiries of the content and the like. Alternatively, if the media server 3 and the media renderer 4 can communicate with each other via another network, the transmission channel may be provide on the other network. In FIG. 1, it is assumed that the available network for the respective AV equipment is one, and transfer of the contents and inquiries are performed by using the network 1.

Respective equipment shown in FIG. 1 include a network interface apparatus and a user interface apparatus in addition to having the same operational function as that of a general-purpose computer equipment.

The media server 3, the media renderer 4, and the controller 5 perform communication by a simple object access protocol (SOAP). The SOAP is a protocol including a simple request message and a response message.

Figure 2:
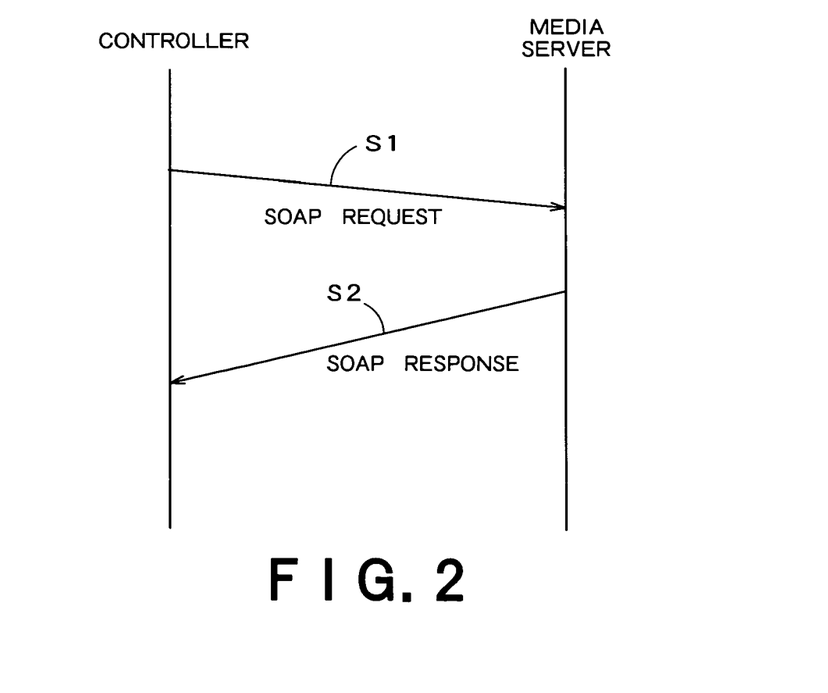
FIG. 2 is a sequence diagram showing procedure in the SOAP transferred between the controller 5 and the media server 3.

FIG. 2 is a sequence diagram showing procedure in the SOAP transferred between the controller 5 and the media server 3. When the controller 5 issues a SOAP request indicating an inquiry of content information, to the media server 3 (step S1), the media server 3 searches and obtains the content information corresponding to the inquiry, and returns the result as a SOAP response to the controller 5 (step S2).

Figure 3:
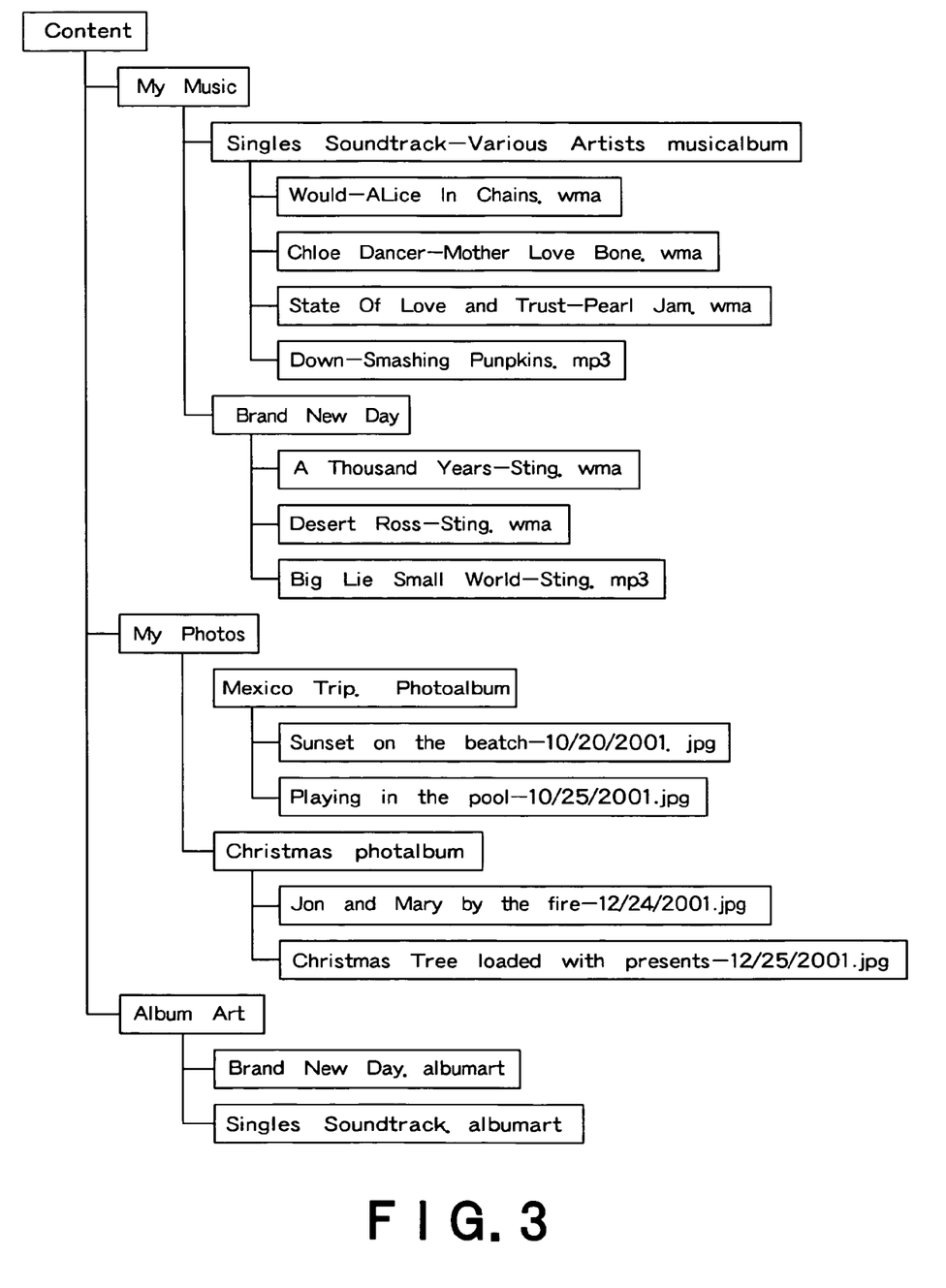
FIG. 3 is a diagram showing the structure of the content directory held by the media server 3.

FIG. 3 is a diagram showing the structure of the content directory held by the media server 3. "Content" is in a root directory, and three folders, "My Music", "My Photo" and "Album Art", exist in a lower hierarchy. A plurality of folders for filing exists in the lower hierarchy, and the content information relating to the individual content resource is located in the lower hierarchy.

Respective elements in FIG. 3 are managed by an identifier, for example, the identifier for "Content" is "0" and the identifier for "My music" is "1".

FIG. 4 is a diagram showing an inquiry to the content directory service of the media server 3 by the controller 5 and a response example thereof. Specifically, FIG. 4 shows a request for browsing the contents in the lower hierarchy of "Singles Soundtrack-Various Artists musicalbum" (identifier "3") in FIG. 3 and the response content.

The first request r1 in FIG. 4 means that the information of all sub-elements below the elements of identifier "3" is rearranged and outputted in the order of titles only from the first (0-th) to the third. In the response corresponding thereto, the corresponding elements are arranged, and the respective element indicates the meta information for one content resource. For example, the element of the identifier number 6 is item, the parented identifier is "3", the title is "Chloe Dancer", the artist is "Mother Love Bone", and the content resource is http://192.168.10.123/getcontent.asp?id=6. A "http-get" indicates that it can be obtained by "Windows Media Audio" and the size thereof is 200000 bytes. The same thing applies to other elements.

The second request r2 is the response for the first request, and is for acquiring the fourth element, since there are four sub-elements.

Figure 5:
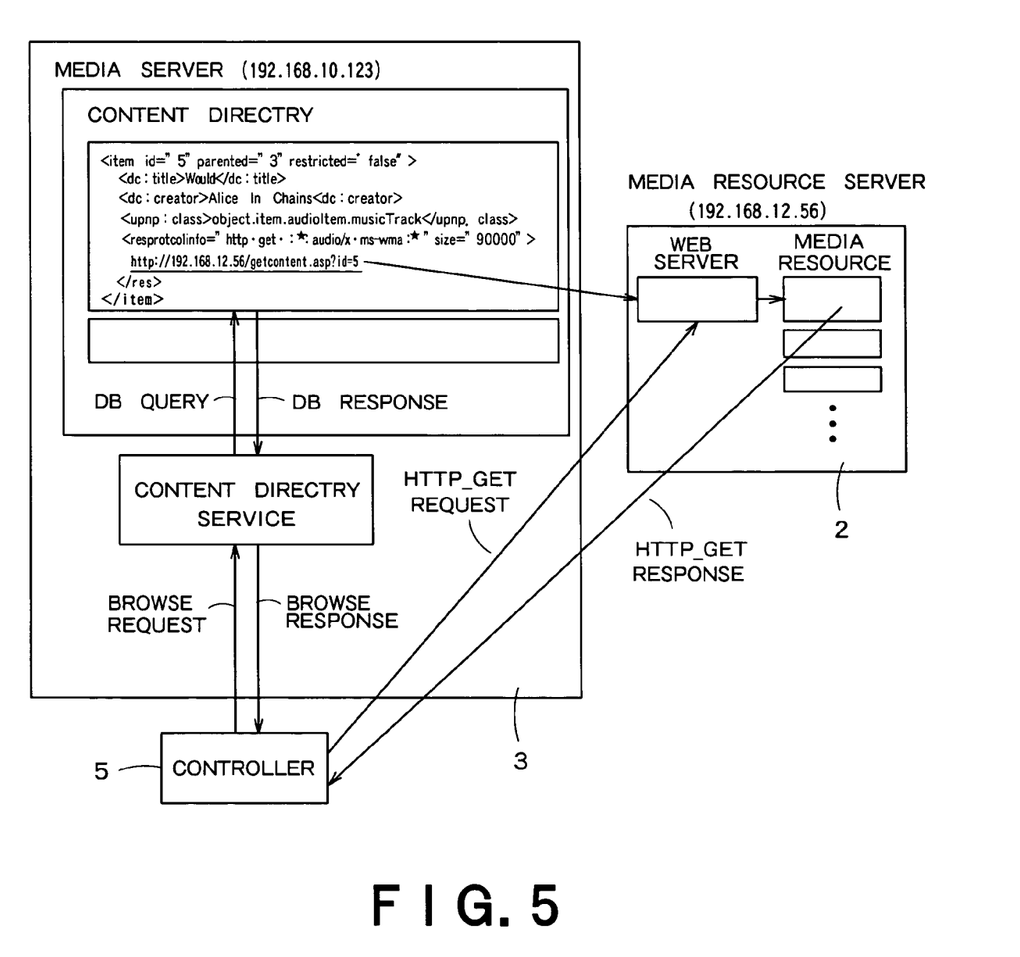
FIG. 5 is a diagram showing a relationship between the content information relating to the last item (id=5) in the response in FIG. 4 and temporary content position information indicating a storage location of the content.

FIG. 5 is a diagram showing a relationship between the content information relating to the last item (id=5) in the response in FIG. 4 and temporary content position information indicating a storage location of the content. In the example shown in FIG. 5, the entity of the content exists on the media resource server 2 different from the media server 3. In this case, the content information indicates a URL address of the media resource server 2 thereof.

As shown in FIG. 5, "192.168.nnn.mmm" (mmm and nnn are the number from 0 to 255) is a private address area and the IP address may change. Even in the network 1 using a private address, there is a possibility that the address is statically allocated and managed. However, this case is not considered herein.

Figure 6:
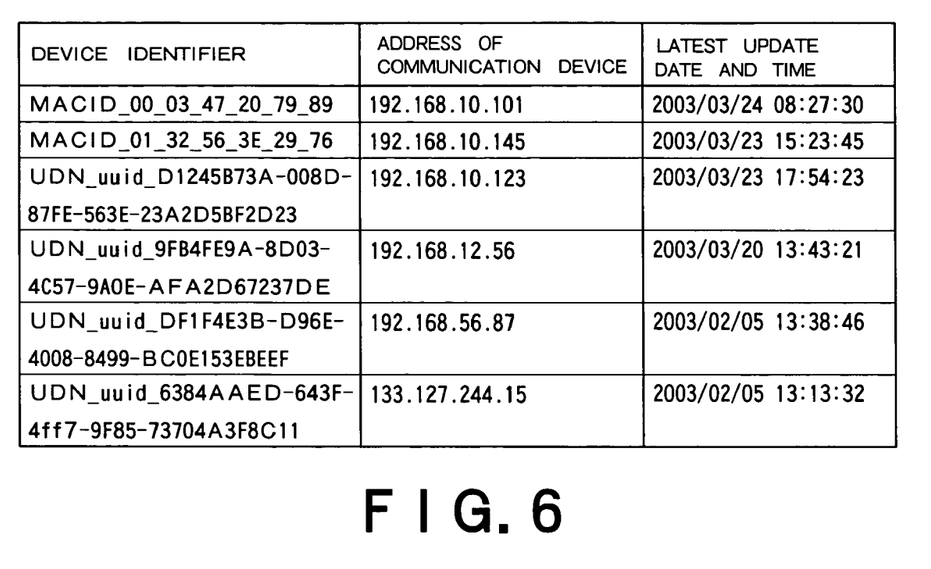
FIG. 6 is a diagram showing one example of an equipment information management table.

FIG. 6 is a diagram showing one example of an equipment information management table. In the equipment information management table shown in FIG. 6, there are six entries, and a permanent equipment identifier (device identifier), a temporary address of a communication device, and the last update date of the address of the communication device are registered. In FIG. 6, two entries of six entries use the permanent equipment identifier based on a MAC address and other four entries use the permanent equipment identifier based on a UDN.

The permanent equipment identifier based on the MAC address is described in the form of MACID_(MAC address), and the permanent equipment identifier based on the UDN is described in the form of UDN_(UDN address).

In the equipment information management table, information other than the three pieces of information above, for example, information on available hours may be included. In the information on available hours, a holding time of an APP cache is described in the case of MACID, and a value based on the cache time of the UDN is described in the case of the UDN.

Figure 7:
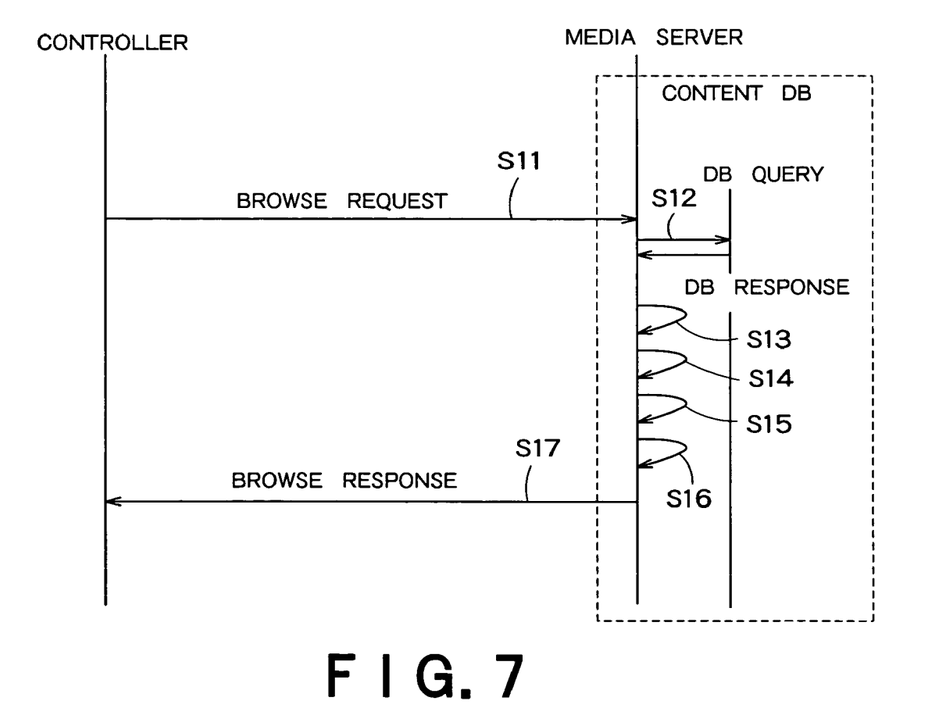
FIG. 7 is a sequence diagram showing a procedure for an inquiry to the content directory service and a response thereof performed between the controller 5 and the media server 3.

FIG. 7 is a sequence diagram showing a procedure for an inquiry to the content directory service and a response thereof performed between the controller 5 and the media server 3. The controller 5 issues a browse request of the content directory with respect to the media server 3 (step S11). Upon reception of the request, the media server 3 searches the content information in the content directory to obtain the content information (step S12). The media server 3 then searches the permanent equipment identifier in the content information and stores the value and the position of the identifier (step S13).

The media server 3 searches an entry of the corresponding permanent equipment identifier from the equipment information management table and obtains the IP address indicating a communication identifier of the entry (step S14).

The media server 3 replaces the permanent equipment identifier included in the temporary content position information in the content information by a communication address (step S15). The media server 3 allows the replaced temporary content position information to reflected on the content information as the content position information (step S16). The content information is returned to the controller 5 as a response from the media server 3 (step S17).

Figure 8:
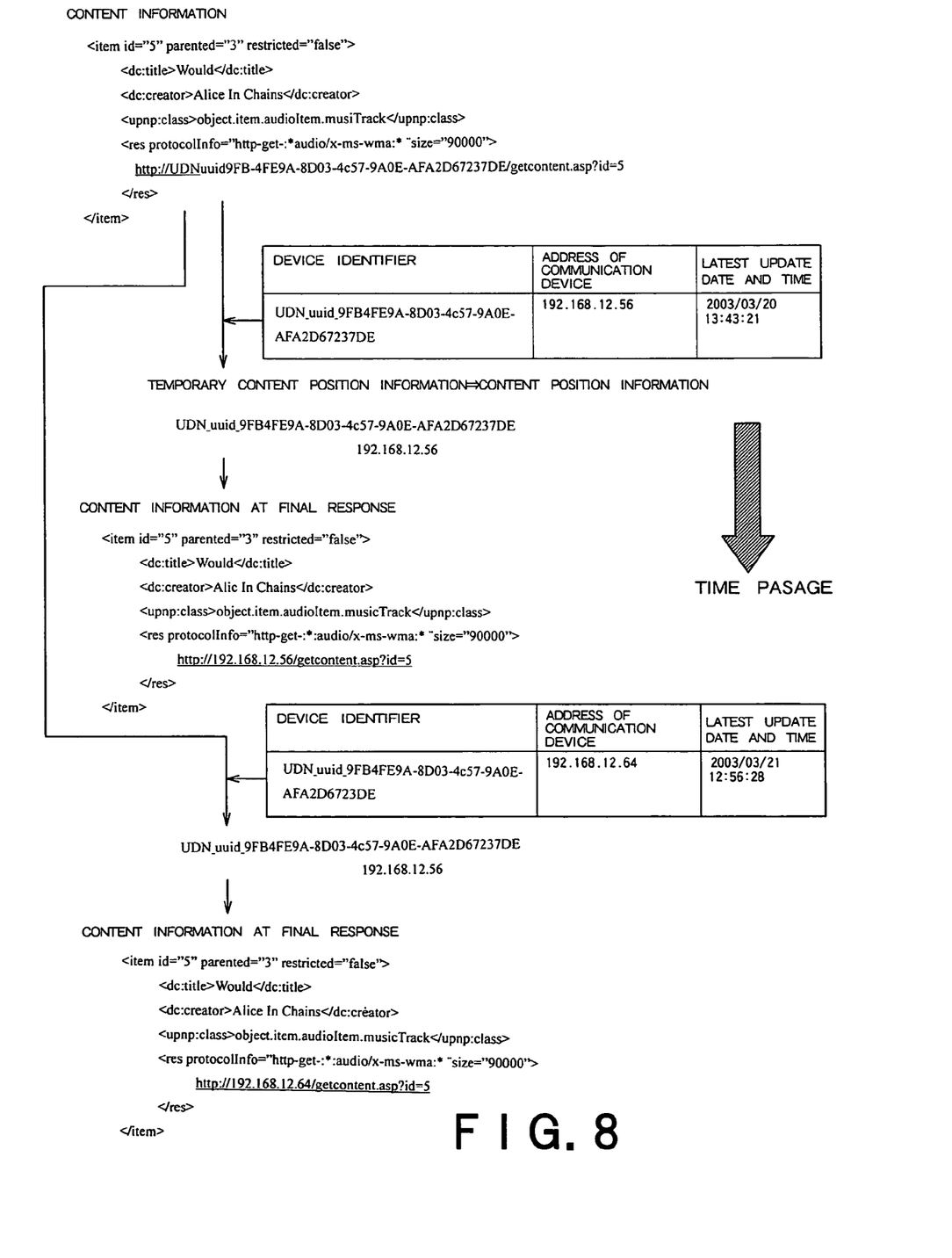
FIG. 8 is a diagram showing a situation in which the content position information included in the content inquiry and response changes with a change in the content of the equipment information management table.

FIG. 8 is a diagram showing a situation in which the content position information included in the content inquiry and response changes with a change in the content of the equipment information management table. In the equipment information management table, it is assumed that a communication device address "192.168.12.56" and the last update date "Mar. 20, 2003 13:43:21" are described corresponding to the permanent equipment identifier "UDN_uuid_9FB4FE9A-8D03-4c57-9A0E-AFA2D67237DE" based on the UDN. In this case, the temporary content position information "UDN_uuid_9FB4FE9A-8D03-4c57-9A0E-
AFA2D67237DE"

included in the content information in the content directory is converted to "192.168.12.56" based on the equipment information management table to obtain the final content information.

Figure 9:
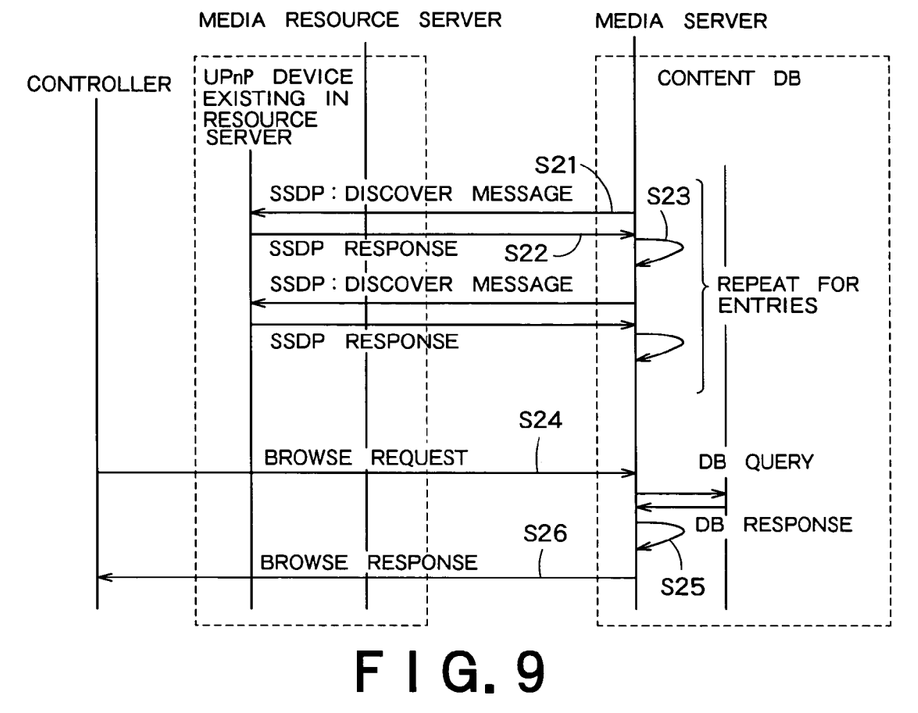
FIG. 9 is a sequence diagram showing a first example of a procedure for updating the equipment information management table, and indicates a processing procedure when performing update of the table at the time of startup of the media server 3.

FIG. 9 is a sequence diagram showing a first example of a procedure for updating the equipment information management table, and indicates a processing procedure when performing update of the table at the time of startup of the media server 3. In FIG. 9, an example in which the content information includes the permanent equipment identifier based on the UDN is shown. In this example, a simple service discovery protocol (SSDP) is used, which is a part of the UPnP specification for obtaining the IP address corresponding to the UD. The procedure is similarly applicable to a case in which the content information includes the permanent equipment identifier based on the MAC address, by using a reverse address resolution protocol (RARP) for obtaining the corresponding IP address from the MAC address, instead of the SSDP.

At the time of startup of the media server 3, an SSDP DISCOVER message is transmitted in the network 1 for each of the permanent equipment identifier based on the UDN, of the respective entries in the equipment information management table (step S21). The content of the SSDP DISCOVER message is for example as shown below.

M-SEARCH *HTTP/1.1
HOST: 239.255.255.250:1900
MAN: "ssdp:discover"
MX: 30
ST: uuid:9FB4FE9A-8D03-4c57-9A0E-AFA2D67237DE In this case, a response by the UPnP device, being uuid: 9FB4FE9A-8D03-4c57-9A0E-AFA2D67237DE, within 30 seconds is requested.

If there is no response in the predetermined time, the entry is left as it is (step S22). When the UPnP device, being the target, is now operating, the device returns a response without fail, according to the standards of the UPnP. For example, a response as described below is received.

HTTP/1.1 200 OK
CACHE-CONTROL: max-age=1800
DATE: Mar. 25, 2003 09:34:25
EXT: LOCATION:http://192.168.12.56/devicedesc.xml
SERVER: OS/version UPnP/1.0 product/version
St: uuid:9FB4FE9A-8D03-4c57-9A0E-AFA2D67237DE
USN: uuid:9FB4FE9A-8D03-4c57-9A0E-AFA2D67237DE::upnp:rootdevice In this case, it is seen that the information is available for only 1800 seconds, and the information of the UPnP can be obtained at http://192.168.12.56/devicdesc.xml. Further, since the media server 3 can know a sender IP address of the response, together with the response message, the media server 3 updates the content of the entry in the equipment information management table, as the communication equipment address (step S23).

The processing of from steps S21 to S23 is repeated for the number of entries. When the controller 5 issues a browse request (step S24), the media server 3 searches the content information in the content directory to obtain the information (step S25) and transmits the information to the controller 5 (step S26).

The SSDP:DISCOVER request may not be transmitted for each UPnP device, but the SSDP:DISCOVER request may be transmitted so that all UPnP route devices in the network 1 respond. The request in this case is as described below.

Figure 10:
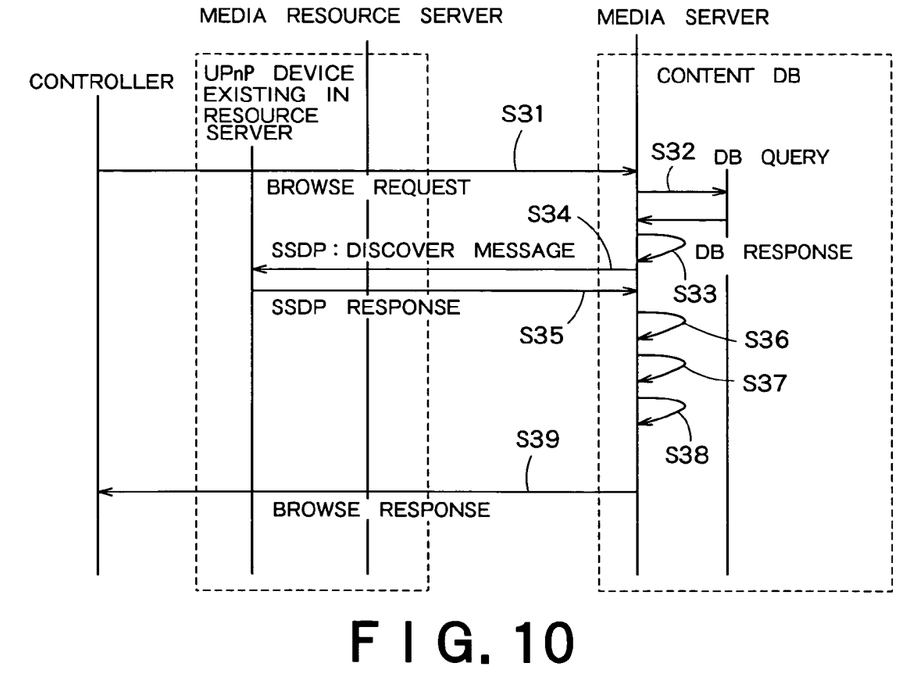
FIG. 10 is a sequence diagram showing a second example of the procedure for updating the equipment information management table, and indicates a processing procedure when performing update of the table at the time of responding to the inquiry from the controller 5.

M-SEARCH *HTTP/1.1
HOST: 239.255.255.250:1900
MAN: "ssdp:discover"
MX: 30
ST: upnp:rootdevice The response in this case becomes as described below.
HTTP/1.1 200 OK
CACHE-CONTROL: max-age=1800
DATE: Mar. 25, 2003 09:34:25
EXT: LOCATION:http://192.168.12.56/devicedesc.xml
SERVER: OS/version UPnP/1.0 product/version
ST: upup:rootdevice
USN: uuid:9FB4FE9A-8D03-4c57-9A0E-AFA2D67237DE::upnp:rootdevice FIG. 10 is a sequence diagram showing a second example of the procedure for updating the equipment information management table, and indicates a processing procedure when performing update of the table at the time of responding to the inquiry from the controller 5.

Upon reception of an inquiry request from the controller 5 (step S31), the media server 3 searches the content information in the content directory to obtain the information (step S32). The media server 3 then searches the permanent equipment identifier in the content information and stores the value and the position thereof (step S33).

The media server 3 then searches the entry of the corresponding permanent equipment identifier from the equipment information management table. When predetermined time has passed since the last update date of the entry, the media server 3 transmits the SSDP:DISCOVER message and waits for a response (step S34). The message form is as shown at step S21.

Upon reception of the response, the media server 3 obtains the IP address of the respondent and updates the corresponding entry in the table (step S35). When there is no response, the media server 3 obtains the IP address in the current entry (step S36).

The media server 3 replaces the permanent equipment identifier included in the temporary content position information in the content information by the IP address obtained at step S35 or 36 (step S37). The media server 3 allows the replaced temporary content position information to be reflected on the content information as the content position information (step S38). The media server 3 then returns the content information as a response to the controller (step S39).

Figure 11:
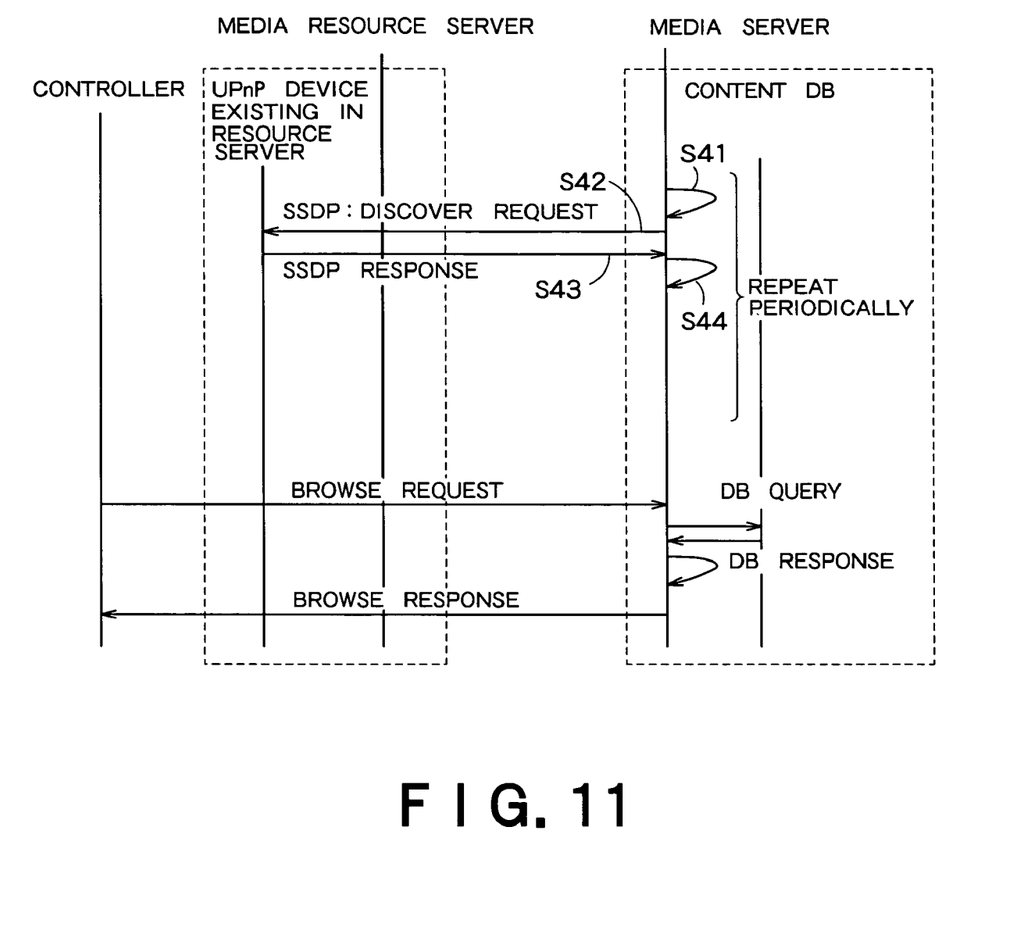
FIG. 11 is a sequence diagram showing a third example of a procedure for updating the equipment information management table, and indicates a processing procedure when performing update of the table for each predetermined time.

FIG. 11 is a sequence diagram showing a third example of a procedure for updating the equipment information management table, and indicates a processing procedure when performing update of the table for each predetermined time.

In FIG. 11, predetermined update time interval and the available hours of the entry are determined, and the processing described below is performed for each time.

At the time of startup of the media server 3, it is determined whether the available hours of the entry have passed since the last update date of the entry, with respect to the respective permanent equipment identifiers based on the UDN, of the respective entries in the equipment information management table (step S41). If the available hours have passed, the media server 3 transmits the SSDP DISCOVER message to the corresponding UDN in the network 1 (step S42). The content of the message is the same as the message transmitted at step S21. If there is no response within the predetermined time, the entry is not changed (step S43), and if there is a response, the content of the corresponding entry in the equipment information management table is updated, designating the IP address of the respondent as the communication equipment address (step S44).

As describe above, according to the present embodiment, the permanent equipment identifier included in the temporary content position information in the content information provided by the media server 3 is replaced by the IP address effective currently for accessing the media resource server 2. Because of this, it is possible to quickly and surely access the media resource server 2 holding desirable contents, and receive offer of the contents.

In this embodiment, an example in which the media server 3 performs conversion of the content information in the content directory has been explained, but the controller 5 or the media renderer 4 may perform the similar conversion. In this case, the equipment identifier management table is placed in the controller 5 or in the media renderer 4, and the content position information in the response generated by the media server 3 does not include the res value by the communication equipment identifier, but includes a value by the permanent equipment identifier. The controller 5 and the media renderer 4 respectively generate a res value based on the final communication equipment identifier by using the equipment identifier management table, based on the response result, to access the content resource.

An example in which an MAC address or UDN is registered as the permanent equipment identifier in the equipment information management table shown in FIG. 6 has been explained, but a fixed IP address may be registered as the permanent equipment identifier. In this case, since it cannot be recognized only by the IP address whether the IP address dynamically changes, it is desired to register, in the equipment information management table, information indicating whether the IP address dynamically changes as well.

The IP address and the TCP/IP protocol are based on the IPv4, but these are similarly applicable to the IPv6.

At least portion of the communication system described in the above embodiment may be constituted as hardware or software. When the communication system are constituted as software, a program which realizes at least some functions of the communication system may be stored in a recording medium such as a floppy disk or a CD-ROM or the like, loaded on a computer, and then executed by the computer. The recording medium is not limited to a portable recording medium such as a magnetic disk or an optical disk. A fixed recording medium such as a hard disk drive or a memory may be used.

A program which realizes at least some functions of the communication system may be distributed through a communication network (including wireless communication) such as the Internet or the like. In addition, the program may be coded, modulated, or compressed and then distributed through a cable network or a wireless network such as the Internet. Alternatively, the program may be distributed being stored in a recording medium.

What is claimed is:

1. A content management apparatus, comprising:
   a content information acquisition unit which acquires content information including permanent identification information for identifying a first communication apparatus as a storage location of contents;
   an equipment information management table which associates the permanent identification information for identifying said first communication apparatus with temporary communication address information for communicating with said first communication apparatus;
   a table update unit configured to update said equipment information management table;
   a location information replacement unit configured to replace the permanent identification information in the content information with the temporary communication address, based on said equipment information management table;
   a content information provider which provides the content information including the temporary communication address to a second communication apparatus; and
   a recording medium for storing at least the equipment information management table.

2. The content management apparatus according to claim 1, wherein said content information provider provides to a control apparatus information relating to the contents provided to said second communication apparatus by said first communication apparatus, when said control apparatus requests the information relating to the contents provided to said second communication apparatus.

3. The content management apparatus according to claim 2, wherein said first and second communication apparatuses and said control apparatus communicate using with a UPnP (Universal Plug and Play) standard.

4. The content management apparatus according to claim 1, wherein said table update unit updates said equipment information management table at start-up time.

5. The content management apparatus according to claim 1, wherein said table update unit updates said equipment information management table when disclosure of information relating to the contents provided by said first communication apparatus is requested.

6. The content management apparatus according to claim 1, wherein said table update unit updates information relating to the contents when a predetermined time has passed after a previous update is registered in said equipment information management table.

7. The content management apparatus according to claim 1, wherein the permanent identification information is at least one of a UDN (Unique Device Name) and a MAC (Media Acess Control) address.

8. The content management apparatus according to claim 1, wherein said table generator adds, to said equipment information management table, information indicating whether or not the communication address of said first communication apparatus changes depending on time.

9. A content management system, comprising:
   a first communication apparatus which provides contents;
   a second communication apparatus which receives the contents provided from said first communication apparatus;
   a content management apparatus which provides information relating to the contents provided by said first communication apparatus; and
   a control apparatus which controls providing the contents from said first communication apparatus to said second communication apparatus, wherein said content management apparatus includes:
   a content information provider which provides content information including permanent identification information for identifying the first communication apparatus as a storage location of the contents;
   an equipment information management table which associates the permanent identification information for identifying said first communication apparatus with temporary communication address information for communicating with said first communication apparatus;
   a table update unit configured to update said equipment information management table;
   a location information replacement unit configured to replace the permanent identification information with the temporary communication address, based on said equipment information management table; and
   a recording medium for storing at least the equipment information management table.

10. The content management system according to claim 9, wherein said content information provider provides to said control apparatus the information relating to the contents provided by said first communication apparatus, when said control apparatus requests the content information.

11. The content management system according to claim 9, wherein said table update unit updates said equipment information management table when disclosure of the information relating to contents provided by said first communication apparatus is requested.

12. The content management system according to claim 9, wherein said table update unit updates the information relating to the contents when a predetermined time has passed after a previous update, is registered in said equipment information management table.

* * * * *